July 22, 1958 W. A. RINGLER 2,844,281
MULTI-CELLED ARTICLE CARRIERS
Filed Sept. 21, 1954 9 Sheets-Sheet 3
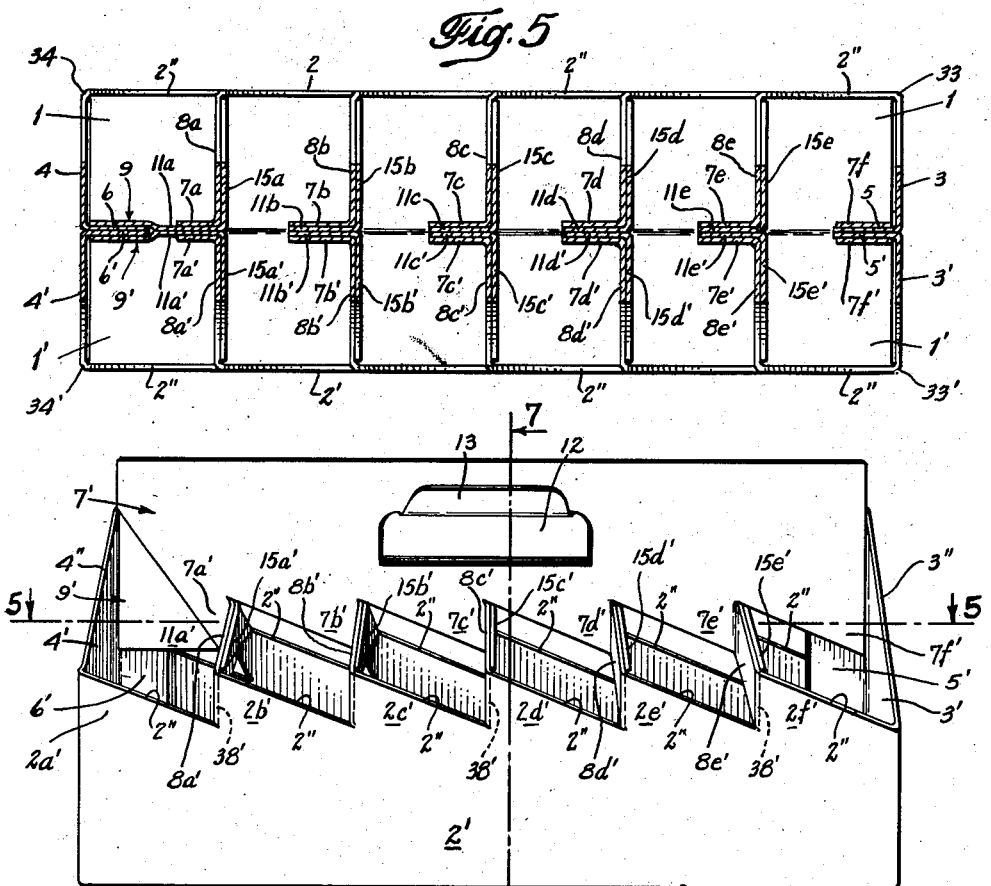
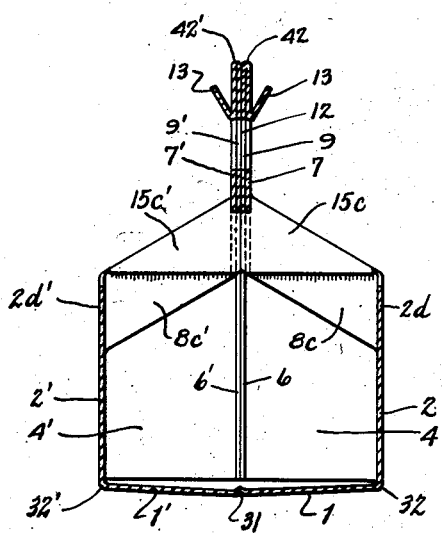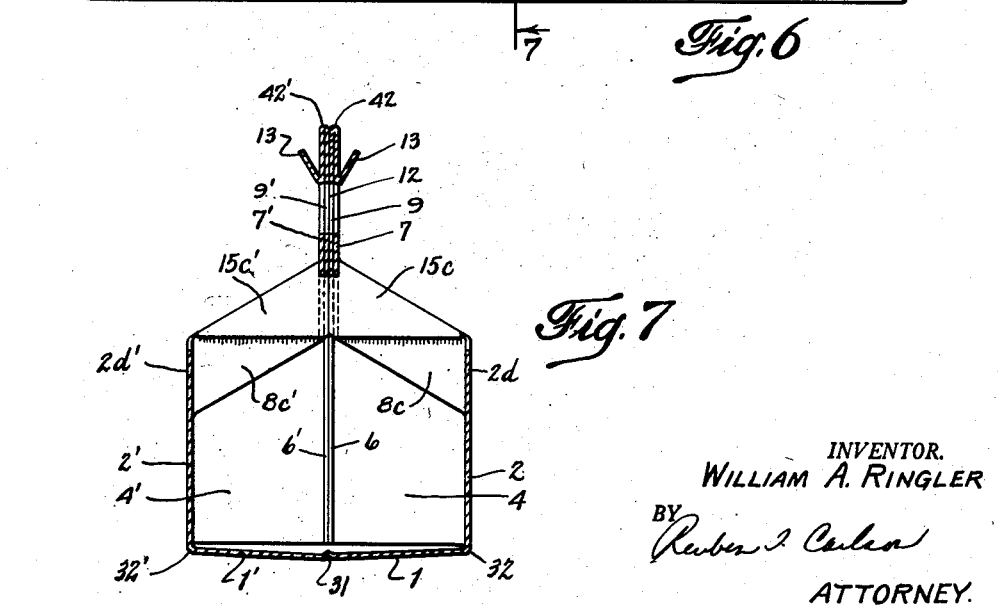
INVENTOR.
WILLIAM A. RINGLER
BY
ATTORNEY.

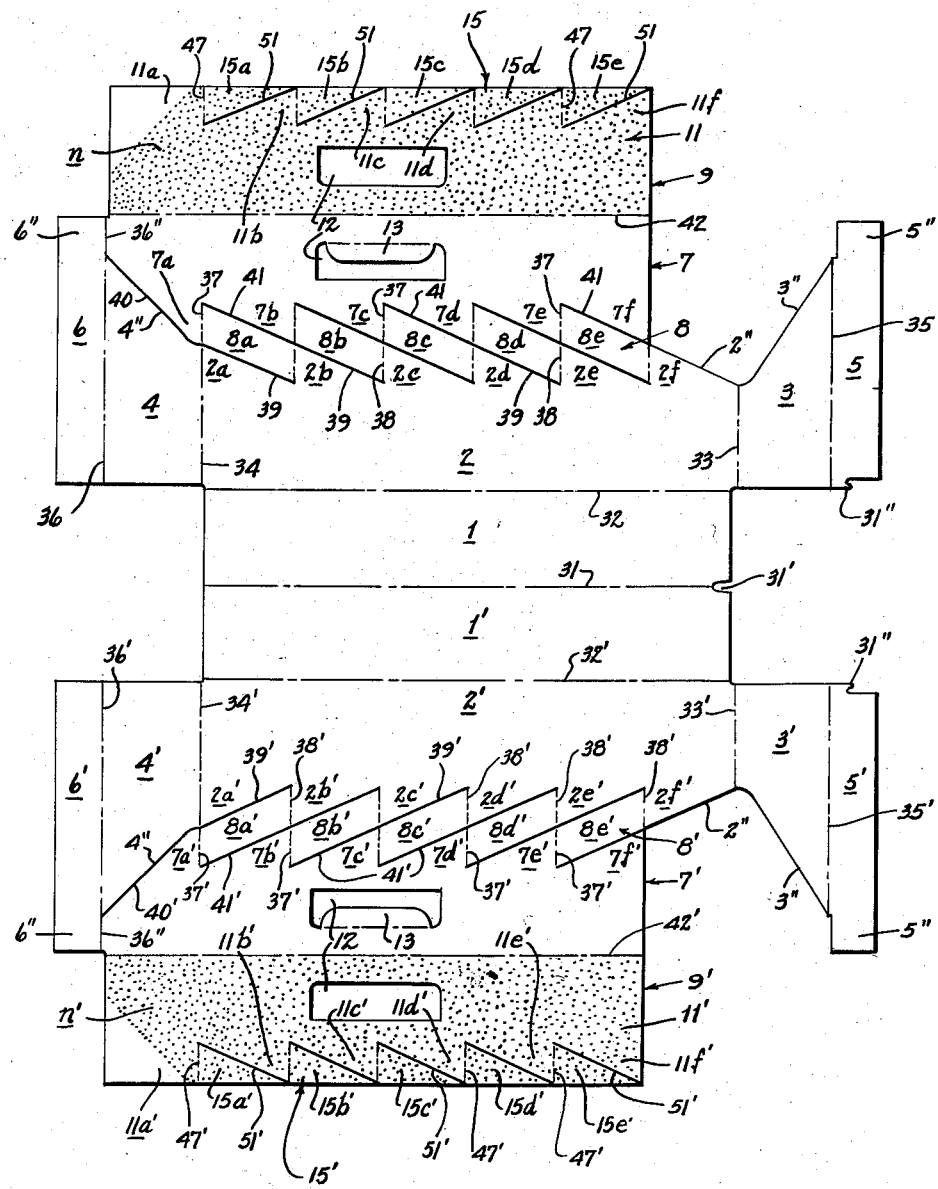

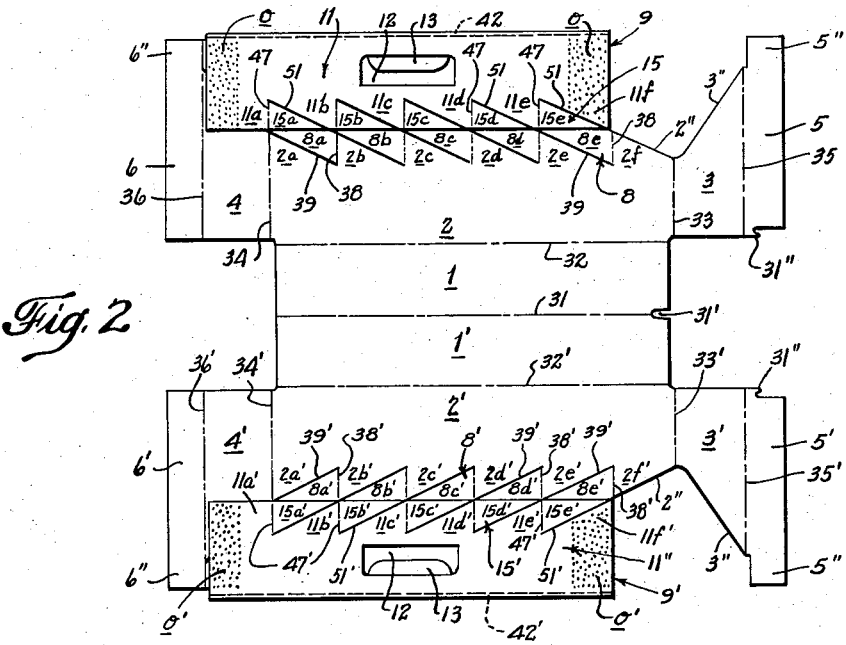
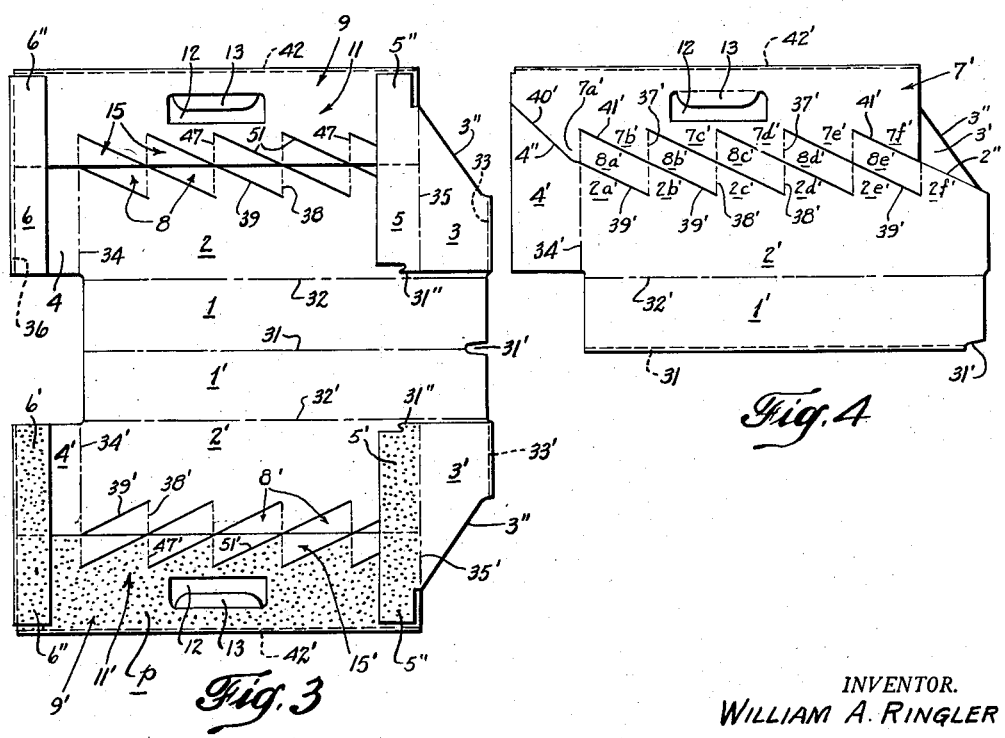
July 22, 1958 W. A. RINGLER 2,844,281
MULTI-CELLED ARTICLE CARRIERS
Filed Sept. 21, 1954 9 Sheets-Sheet 2
INVENTOR.
WILLIAM A. RINGLER
BY
ATTORNEY.

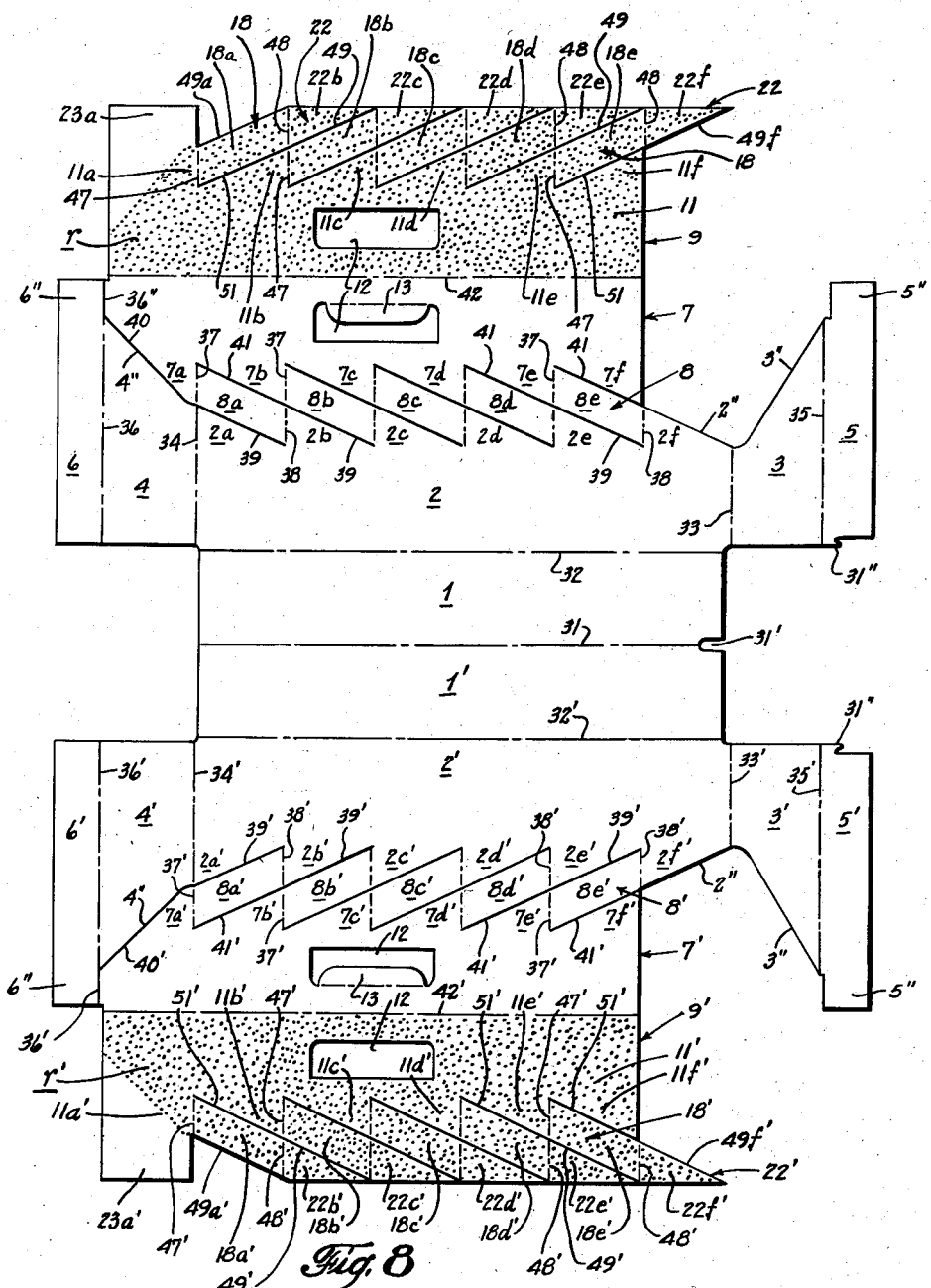

July 22, 1958 — W. A. RINGLER — 2,844,281
MULTI-CELLED ARTICLE CARRIERS
Filed Sept. 21, 1954 — 9 Sheets-Sheet 5
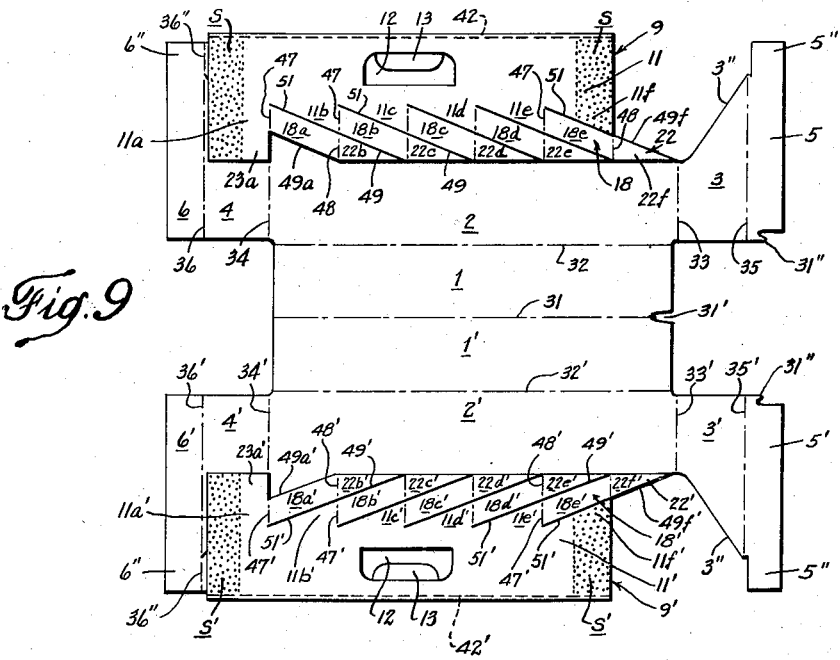
Fig. 9
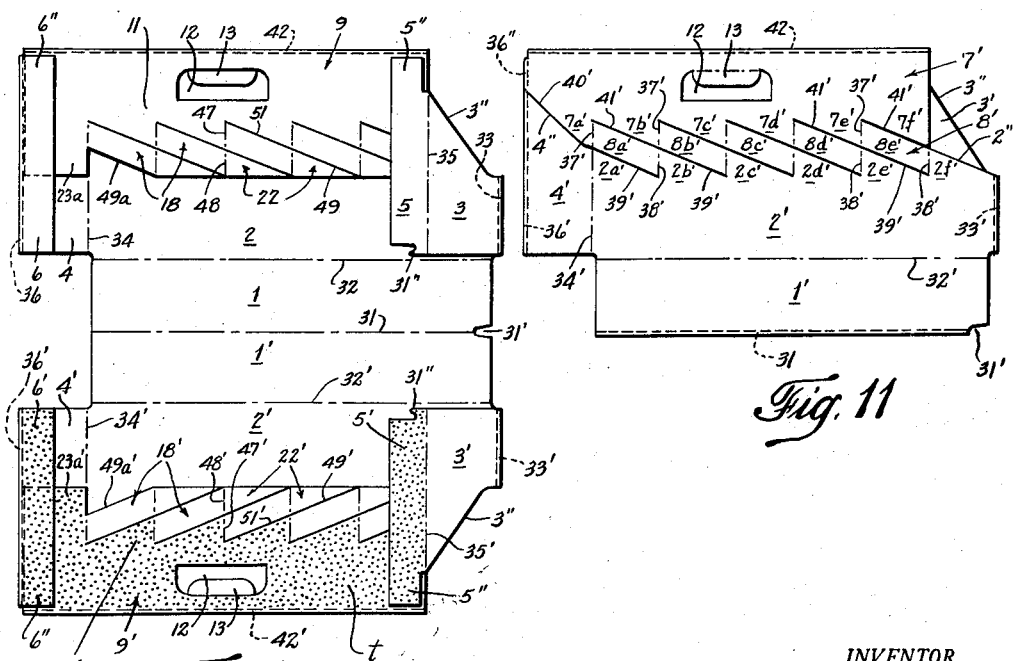
Fig. 10
Fig. 11
INVENTOR.
WILLIAM A. RINGLER
BY
ATTORNEY July 22, 1958 W. A. RINGLER 2,844,281
MULTI-CELLED ARTICLE CARRIERS
Filed Sept. 21, 1954 9 Sheets-Sheet 6
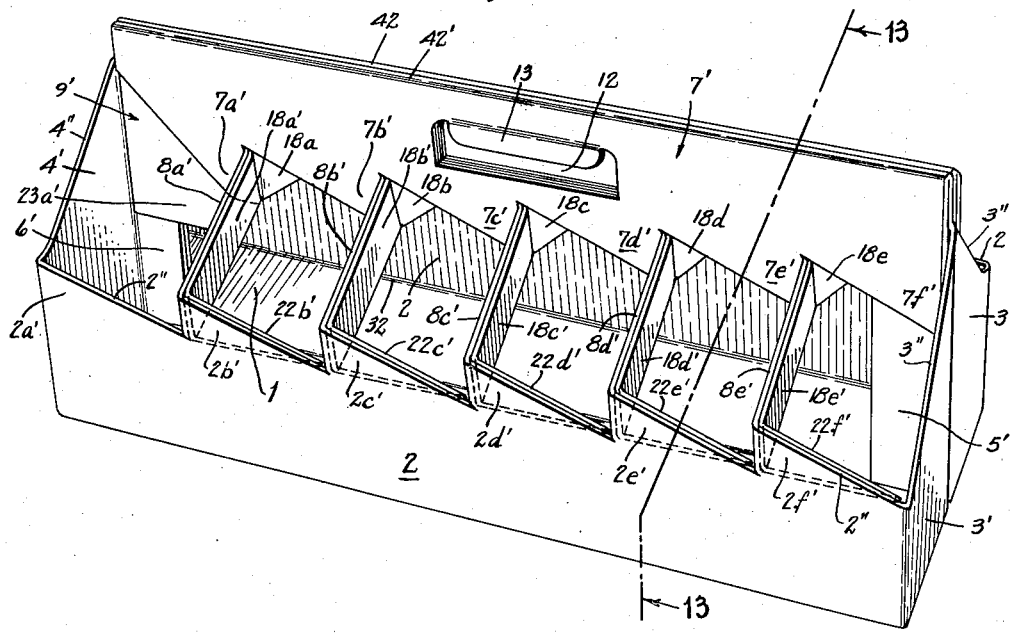
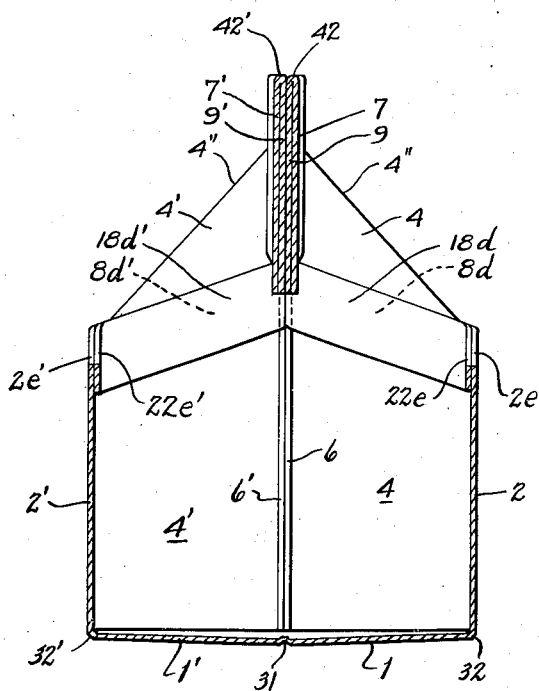
INVENTOR:
WILLIAM A. RINGLER
BY
ATTORNEY.

July 22, 1958 W. A. RINGLER 2,844,281
MULTI-CELLED ARTICLE CARRIERS
Filed Sept. 21, 1954 9 Sheets-Sheet 8
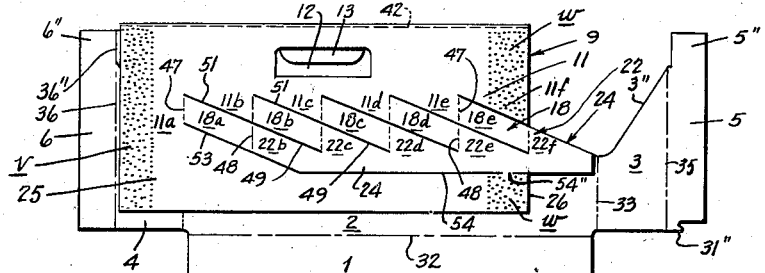
Fig. 15
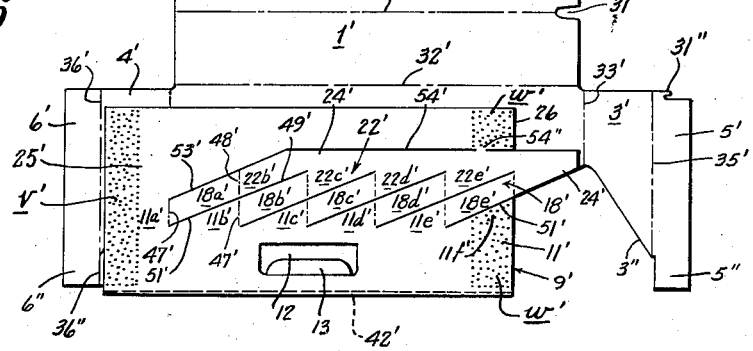
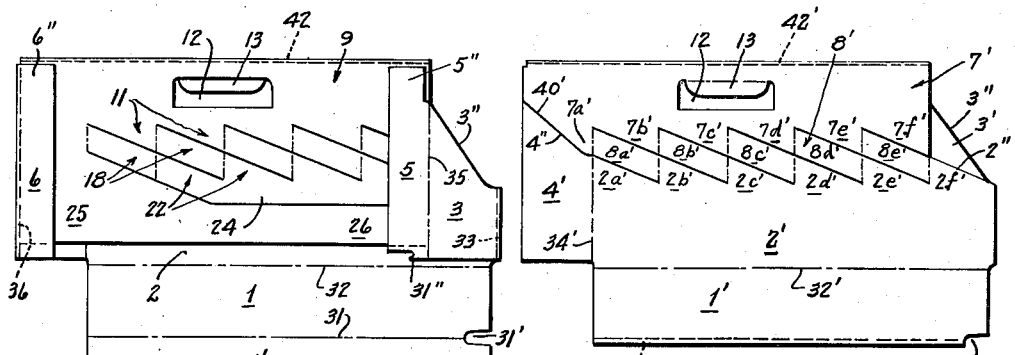
Fig. 16
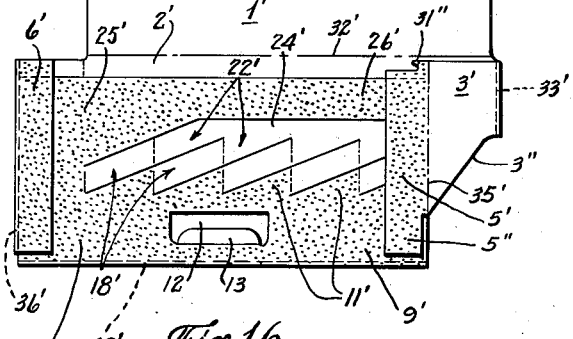
Fig. 17
INVENTOR:
WILLIAM A. RINGLER
BY
ATTORNEY July 22, 1958 W. A. RINGLER 2,844,281
MULTI-CELLED ARTICLE CARRIERS
Filed Sept. 21, 1954 9 Sheets-Sheet 9
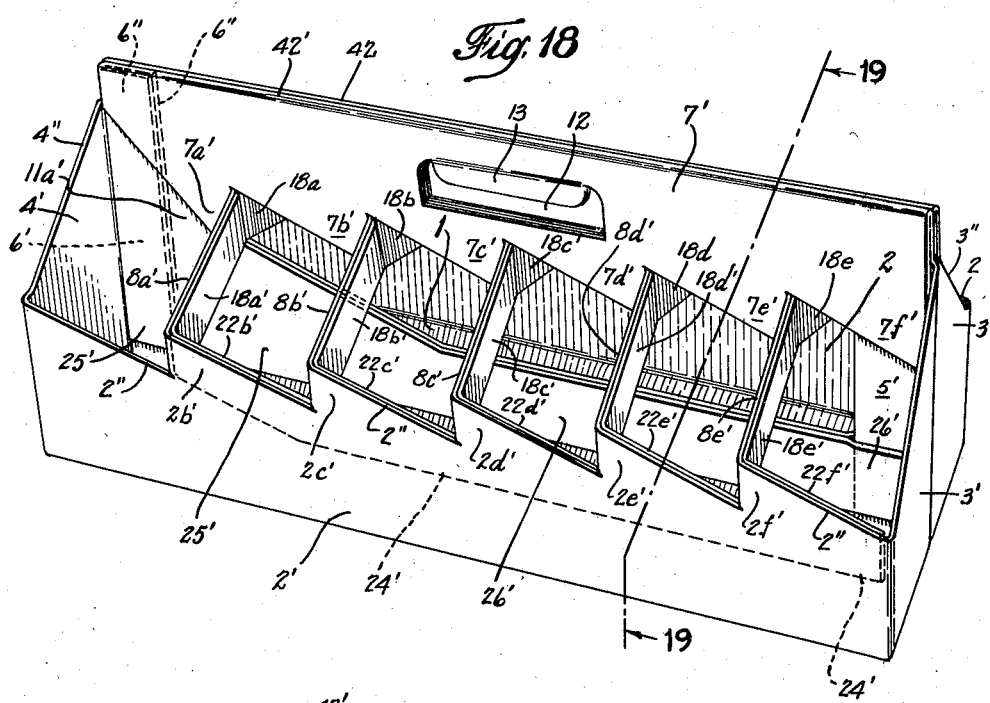
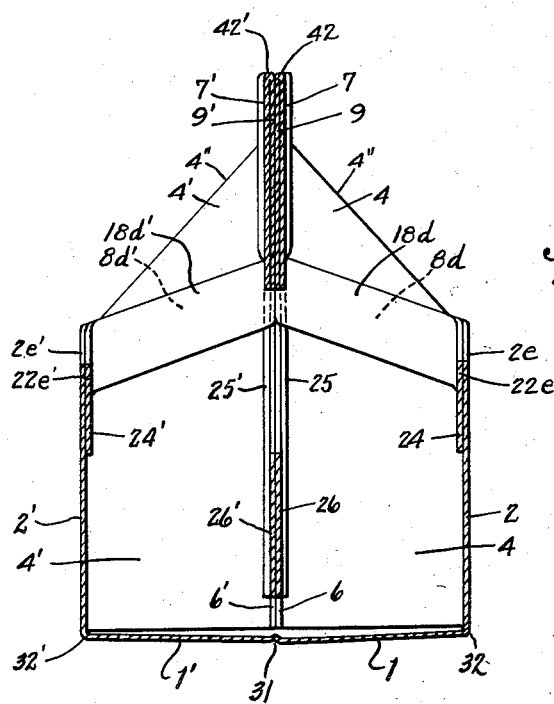
INVENTOR.
WILLIAM A. RINGLER
BY
ATTORNEY.

United States Patent Office
2,844,281
Patented July 22, 1958

2,844,281

MULTI-CELLED ARTICLE CARRIERS

William A. Ringler, Wayne, Pa., assignor, by mesne assignments, to Diamond Gardner Corporation, a corporation of Delaware Application September 21, 1954, Serial No. 457,510

9 Claims. (Cl. 220—113)

This invention relates to multi-celled article carriers formed from paperboard or fiberboard and designed to permit flat collapse thereof for economical shipment and storage and convenient erection for article filling and transportation.

Article carriers constructed in accordance with this invention present twin compartments having any desired number of articles receiving cells and a center partition structure which includes a pair of outer center partition sections having spaced tab portions projecting from the lower end thereof. The article receiving cells are defined by a series of cross partition straps which are integrally hinged at the inner end thereof to the tab portions of the adjacent outer center partition section and at the other end thereof to the adjacent side panel. The outer center partition sections are integrally hinged at one end thereof to end extensions which project upwardly from center partition securing flaps hinged to the adjacent end panel sections. A pair of skeleton panels integrally hinged to the longitudinal upper edge of the outer center partition sections include as a part thereof a pair of inner center partition sections which are sandwiched between the outer center partition sections to provide a four-ply handle part.

The article carriers of this invention are featured by reinforcing elements captured from the skeleton panels and designed to be adhesively secured to the main cell-defining cross partition straps to thereby reinforce and strengthen the cross partition straps which are particularly subjected to breakage during use. In one form of the invention, the strap reinforcing elements comprise a series of triangular segments integrally hinged to the inner center partitition sections of the skeleton panels and designed to be adhesively secured to the upper ends of the cross partition straps adjacent the center partition structure where the straps are subjected to the greatest strain.

In another form of this invention, the reinforcing elements as captured from the skeleton panels extend the full length of the main cross partition straps and are provided with tab extensions designed to be adhesively secured to the inside face of the adjacent side panels, thereby providing composite double-ply cross partition straps whose hinging junctures with the side panels and center partition structure are also of double-ply thickness.

In a further form of this invention, the strap reinforcing elements as captured from the skeleton panels not only reinforce the main cross partition straps and their hinging junctures with the side panels and the center partition structure to thereby provide composite double-ply cross partition straps of great strength and rigidity, but the lower ends of the strap reinforcing elements are also integrally joined in series to a longitudinally extending reinforcing band designated to be adhesively secured to the inside face of the adjacent side panel to thereby also strengthen and reinforce the side panels. In this form of invention, the skeleton panels may also be equipped with center divider sections positioned below the composite, double-ply cross partition straps and designed to extend in paired relation medially along the erected bottom panel to thereby separate and provide cushioned protection for adjacent articles in the twin compartments of the carrier.

These carriers may all be formed from one-piece blanks of appropriate dimensional size to provide carriers having six, eight, twelve or any desired even number of article receiving cells. These one-piece blanks may be cut and scored from selected stock sheets of paperboard or fiberboard material previously imprinted and decorated on one side thereof only. These carrier blanks are so cut and formed as to permit high speed gluing and folding of the blanks into completed article carriers in collapsed form in a single pass through a standard gluing and folding machine.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. 1 is a plan view of a prepared blank from which a twelve-cell article carrier is formed in accordance with this invention, this view showing adhesive applied to certain areas of a blank preparatory to executing the first folding operation;

Fig. 2 is a plan view of the blank shown in Fig. 1 as it would appear after execution of the first folding operation, adhesive being shown applied to further areas of the blank preparatory to executing the second folding operation;

Fig. 3 is a plan view of the blank shown in Fig. 2 as it would appear after execution of the second folding operation thereon, additional areas of adhesive being shown applied thereto preparatory to executing the third and final folding operation;

Fig. 4 is a plan view of the carrier as it would appear after the fourth and final folding operation has been performed on the blank shown in Fig. 3 to produce a fully assembled carrier in collapsed form ready for shipment;

Fig. 5 is a horizontal cross section of the erected carrier as it would appear when viewed along line 5—5 of Fig. 6;

Fig. 6 is a perspective view of the carrier shown in Fig. 4 as it would appear when fully erected;

Figure 14:
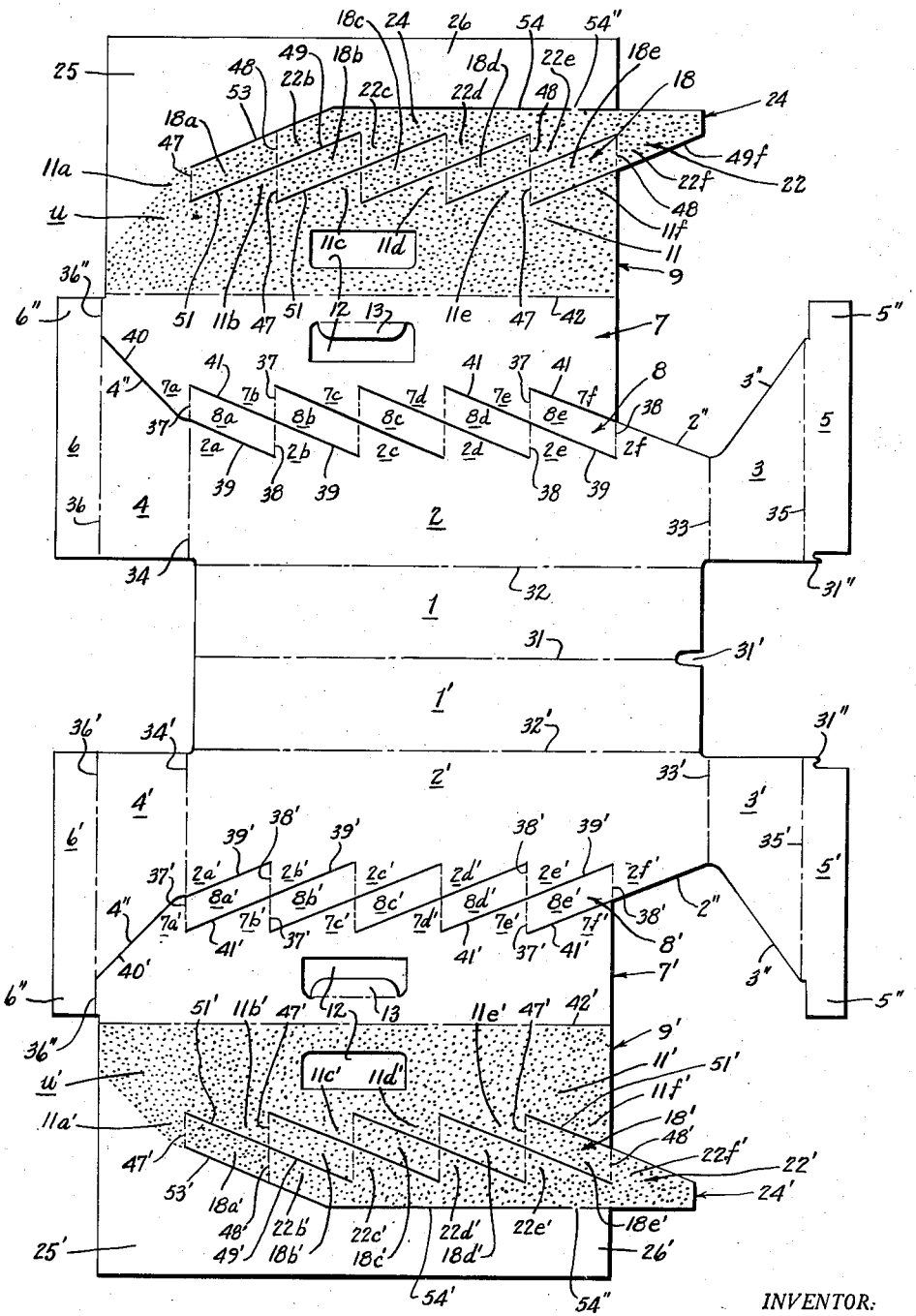

Fig. 7 is a vertical section taken transversely of the carrier as it would appear when viewed along line 7—7 of Fig. 6, Fig. 8 is a plan view of a prepared blank of modified form and equipped with reinforced elements designed to reinforce the main cross-partition straps for the full length thereof, this view showing adhesive applied to certain areas of the blank preparatory to executing the first folding operation thereon;

Fig. 9 is a plan view of the blank shown in Fig. 8 as it would appear after execution of the first folding operation, adhesive being shown applied to further areas of the blank preparatory to executing the second folding operation;

Fig. 10 is a plan view of the blank shown in Fig. 9 as it would appear after execution of the second folding operation, additional areas of adhesive being shown applied thereto preparatory to executing the third and final folding operation;

Fig. 11 is a plan view of the carrier as it would appear after the third and final folding operation has been performed on the blank shown in Fig. 10 to thereby produce a fully assembled carrier in collapsed form ready for shipment;

Fig. 12 is a perspective view of the carrier shown in Fig. 11 as it would appear when fully expanded; and Fig. 13 is a vertical section taken transversely of the carrier as it would appear when viewed along lines 13—13 of Fig. 12.

Fig. 14 is a plan view of a carrier blank of further modified form and equipped with reinforcing elements designed to reinforce the main cross partition straps for the full length thereof and additionally equipped with a pair of center divider sections designed to separate adjacent articles in the twin compartments of the assembled carrier, this view showing adhesive applied to certain areas of the blank preparatory to executing the first folding operation thereon;

Fig. 15 is a plan view of the blank shown in Fig. 14 as it would appear after execution of the first folding operation, adhesive being shown applied to further areas of the blank preparatory to executing the second folding operation;

Fig. 16 is a plan view of the blank shown in Fig. 15 as it would appear after execution of the second folding operation, additional areas of adhesive being shown applied thereto preparatory to executing the third and final folding operation;

Fig. 17 is a plan view of the carrier as it would appear after the third and final folding operation has been performed on the blank shown in Fig. 16 to thereby produce a fully assembled carrier in collapsed form ready for shipment;

Fig. 18 is a perspective view of the carrier shown in Fig. 17 as it would appear when fully erected; and Fig. 19 is a vertical section taken transversely of the carrier as it would appear when viewed along line 19—19 of Fig. 18.

Similar reference characters refer to similar parts throughout the several views of the drawings and the specification.

The carrier forming blanks as shown in Figs. 1, 8 and 14 may all be cut and scored from selected paperboard or fiberboard stock sheets previously finished and imprinted on one side thereof only. These blanks may be cut from the stock sheets in a single pass through the cutting and scoring machine to provide fully cut and scored blanks ready for gluing and assembly into carrier form. These blanks may be appropriately sized, cut and scored to form carriers of any desired even number of cells as merchandise requirements may indicate, such as carriers having twelve or more cells, or carriers having any even number of cells, such as eight or six cells.

The blanks shown in Figs. 1, 8 and 14 present bottom panel sections 1—1' of appropriate length to support the desired number of articles, the bottom panel sections 1—1' being foldably connected along a bottom collapsing score 31 which is approximately medially of the blank. Side panels 2—2' are foldably connected to the opposite side edges of the bottom panel sections 1—1' along parallel extending scores 32—32'. The side panels 2—2' have approximately the same length as the bottom panel sections 1—1' to accommodate the desired number of articles placed in the cells thereof. A pair of end panel sections 3—3' are foldably connected to the adjacent end edges of the side panels 2—2' along aligned transverse scores 33—33' and present inclined top edges 3". A pair of similar end panel sections 4—4' are foldably connected to the opposite end edges of the side panels 2—2' and also present inclined top edges 4" which may conform in shape to the top edges 3".

A pair of center partition securing flaps 5—5' are foldably connected along aligned transverse scores 35—35' to the adjacent end panel section 3—3', and a similar pair of center partition securing flaps 6—6' are foldably connected to the adjacent end panel sections 4—4' along aligned transverse scores 36—36'. The center partition securing flaps 5—5' present end extensions 5" extending beyond the inclined top edges 3" of the adjacent end panel sections 3—3', and the center partition securing flap 6—6' also present end extensions 6" extending beyond the inclined top edges 4" of the adjacent end panel sections 4—4".

All the blank forms shown in Figs. 1, 8 and 14 present a pair of outer center partition sections 7—7' having a length which is approximately equal to the length of the adjacent side panels 2—2' but are offset with respect thereto and are integrally hinged at one end thereof by score extensions 36" to the end extensions 6" of the adjacent center partition securing flaps 6—6'. The outer center partition sections 7—7' are joined at the lower ends thereof by a series of inclined cross-partition straps 8—8' to the adjacent upper edges of the side panels 2—2'. The main cross partition straps 8—8' may be similar in form and shape and are integrally hinged at the upper ends thereof by spaced vertical scores 37—37' to tab portions extending downwardly from the outer center partition sections 7—7'. The lower ends of the main cross partition straps 8—8' are integrally hinged by spaced vertically extending scores 38—38' to a series of tab portions projecting upwardly from the side panels 2—2'. The cross partition straps 8—8' are otherwise separated from the side panels 2—2' by a series of spaced inclined cuts 39—39' extending generally in parallel relation to thereby define the upper inclined edges 2" of the saw-toothed tabs 2a—2a'; 2b—2b'; 2c—2c'; 2d—2d' and 2e—2e' extending upwardly from the side panels 2—2'.

The end portions of the outer center-partition sections 7—7' which overhang the adjacent end panel sections 4—4' are separated therefrom by line cuts 40—40' and these cuts define the upper inclined edge 4" of the end panel sections 4—4'. A series of spaced and inclined cuts 41—41' which may extend generally parallel to each other and generally parallel to the spaced inclined cuts 39—39' define the upper edges of the cross-partition straps 8—8' and also define the inclined lower edges of the triangular shaped tabs 7b—7b'; 7c—7c'; 7d—7d'; 7e—7e'; and 7f—7f' extending downwardly from the lower ends of the outer center partition sections 7—7'. It will be noted that the tabs 2f—2f' which project upwardly from the side panels 2—2' at one end thereof extend beyond the adjacent ends of the outer center partition sections 7—7' as the blank is formed and the top edges 2" thereof are preferably shaped in contour conformity with the inclined upper edges 2" of the other tabs which project upwardly from the side panels 2—2' it will also be noted that the adjacent triangular shaped tabs 7f—7f' which project downwardly from the outer center partition sections 7—7' adjacent the free ends thereof do not have any cross partition strap hinged thereto. It will also be noted that the tabs 7a—7a' at the other end of the outer center partition sections 7—7' are defined by the inclined cuts 40—40' and the adjacent vertically extending scores 37—37'.

All of the blank forms of this invention as shown in Figs. 1, 8 and 14 present a pair of skeleton panels 9—9' integrally hinged by longitudinally extending scores 42—42' to the upper longitudinal edges of the adjacent outer center partition sections 7—7'. The skeleton panels 9—9' preferably have substantially the same longitudinal length as the outer center partition sections 7—7'. The skeleton panels 9—9' present a pair of inner center partition sections 11—11' designed to overlie and be adhesively secured to the inner faces of the outer center partition sections 7—7' to thereby provide a handle part of four-ply thickness when the carriers are assembled. Each of the outer center partition sections 7—7' and the inner center partition sections 11—11' present a hand hole 12 therein which falls int oalignment when the blanks are assembled into carrier form. The hand hole openings 12 in the outer center partition sections 7—7' may be each provided with an edging flap 13 to provide a comfortable hand grip.

In the blank shown in Fig. 1, the skeleton panels 9—9' present a series of spaced triangular segments 15—15' which are hinged to the inner center partition sections 11—11' thereof along spaced and vertically extending scores 47—47', but are otherwise separated therefrom by spaced inclined cuts 51—51' contoured in conformity with the upper edges of the main cross partition straps 8—8' which they are to respectively overlap. Thus, the paired triangular segments 15a—15a' are shaped in conformity with the upper ends of the corresponding cross partition straps 8a—8a'; the paired triangular segments 15b—15b' are shaped in conformity with the upper ends of the corresponding cross partition straps 8b—8b'; the paired triangular segments 15c—15c' are shaped in conformity with the upper ends of the corresponding cross partition straps 8c—8c'; the paired triangular segments 15d—15d' are shaped in conformity with the upper ends of the corresponding cross partition straps 8d—8d'; and the paired triangular segments 15e—15e' are shaped in conformity with the upper ends of the corresponding cross partition straps 8e—8e'.

The inclined cuts 51—51' and spaced vertical scores 47—47' which define the triangular segments 15—15' also define the tab portions which extend downwardly from the inner center partition sections 11—11' and which are designed to be adhesively secured to the corresponding tab portions projecting downwardly from the adjacent outer center partition sections 7—7'. Thus, when the carrier is assembled from the blank shown in Fig. 1, the tabs 11f—11f' extending downwardly from the inner center partition sections 11—11' are in shape conformity with and are designed to be adhesively secured to the tabs 7f—7f' extending downwardly from the outer center partition sections 7—7'. Also when the blank is assembled into carrier form, the adjacent tabs 11e—11e' are in shape conformity with and are designed to be adhesively secured to the tabs 7e—7e'; the tabs 11d—11d' are in shape conformity with and are designed to be adhesively secured to the tabs 7d—7d'; the tabs 11c—11c' are in shape conformity with and are designed to be adhesively secured to the tabs 7c—7c'; and the tabs 11b—11b' are in shape conformity with and are designed to be adhesively secured to the tabs 7b—7b'. However, it will be noted that while the tabs 11a—11a' are designed to overlie and be adhesively secured to the tabs 7a—7a', they need not be in shape conformity therewith. For example, the end tab portions 11a—11a' may be rectangular in outline and need not coincide with the adjacent lower inclined edge of the outer cross-partition sections 7—7' as defined by the cuts 40—40' when the carrier is assembled in collapsed form.

It will be noted that when the carrier is assembled in collapsed form, the vertical scores 47—47' which hinge the triangular reinforcing segments 15—15', are so formed as to align with the respective vertical scores 37—37' which hinge the cross partition strops 8—8' to the downwardly projecting tabs of the outer center partition sections 7—7'. Additionally, the lower edges of the tabs 11b—11b'; 11c—11c'; 11d—11d'; 11e—11e' and 11f—11f' as defined by the inclined cuts 51—51' should substantially coincide with the corresponding inclined lower edges of the tabs 7b—7b'; 7c—7c'; 7d—7d'; 7e—7e' and 7f—7f' as defined by the inclined cuts 41—41'. As thus constructed, the hinged joints at the upper ends of the main cross partition straps 8—8' are doubly reinforced.

In assembling the carrier from the blank shown in Fig. 1, adhesive patches n—n' are first applied to the inside faces of the skeleton panels 9—9' over substantially the entire area thereof, including the inner center partition sections 11—11' and their associated triangular segments 15—15' as shown in Fig. 1, except that no adhesive is applied to the end portions of the tabs 11a—11a' which will overlap the upper ends of the end panel sections 4—4' when the carrier is assembled in collapsed form. In the first folding operation, the skeleton panels 9—9' are infolded along the longitudinal scores 42—42' so that the inner center partition sections 11—11' become adhesively secured to the adjacent outer center partition sections 7—7'. In this same folding operation, the triangular segments 15—15' become adhesively secured to the upper portions of the corresponding cross partition straps 8—8', with the transverse scores 47—47' and inclined cuts 51—51' in superimposed alignment with the corresponding transverse scores 37—37' and inclined cuts 41—41'.

In the second gluing operation as shown in Fig. 2, vertical adhesive strips o—o' are applied to the ends of the inner center partition sections 11—11' of the infolded skeleton panels 9—9', care being taken to apply no adhesive to the triangular segments 15—15'. In the second folding operation, the end panel sections 3—3' are folded along the aligned transverse scores 33—33' so as to place the center partition flaps 5—5' associated therewith in adhesively secured relation to the adjacent glued end surfaces of the inner center partition sections 11—11' as shown in Fig. 3. In substantially the same folding operation, the center partition flaps 6—6' at the other end of the blank are infolded along the aligned transverse scores 36—36' so as to place the same in secured relation to the adjacent glued ends of the inner center partition sections 11—11'.

In the third and final gluing operation, an adhesive patch p is applied to the exposed face of the inner center partition section 11' and the exposed tab portions thereof, and also to the center partition securing straps 5' and 6' as shown in Fig. 3, care being taken to apply no adhesive to the exposed triangular segments 15' or the adjacent cross partition straps 8'. In the final folding operation, the partially assembled blank as shown in Fig. 3 is folded along the bottom collapsing score 31 so as to place the center partition securing flaps 5' and 6' in registered and secured relation to the corresponding center partition securing flaps 5 and 6, and to also secure the inner center partition section 11' and its associated tab portions in registered relation to the inner center partition section 11 and its corresponding tab portions, thereby completing the assembling of the carrier in collapsed form as shown in Fig. 4.

In the blank forms shown in Figs. 8 and 14, the skeleton panels 9—9' each present a series of secondary cross partition straps 18—18' which are hinged to the inner center partition sections 11—11' thereof along spaced vertical extending scores 47—47'. A series of secondary tab extensions 22—22' are hinged by spaced vertically extending scores to the respective secondary cross partition straps 18—18'. The secondary cross partition straps 18—18' are separated from the tab portions of the inner center partition sections 11—11' by spaced inclined cuts 51—51'. The cuts 51—51' define the upper inclined edges of the secondary cross partition straps 18—18' as well as the inclined lower edges of the triangular tab portions which extend downwardly from the inner center partition sections 11—11' when these blanks are assembled into carrier form. The lower edges of the secondary cross partition straps 18—18' are defined by and separated from the adjacent secondary tab extensions 22—22' by spaced inclined cuts 49—49'. The inclined cuts 49—49' may be formed as linear extensions of the adjacent inclined cuts 51—51' as shown in Figs. 8 and 14.

As thus cut and scored, the blanks shown in Figs. 8 and 14 present secondary cross partition straps 18—18' in contour conformity with the main cross partition straps 8—8' to which they are to be adhesively secured, and additionally present secondary tab extensions 22—22' which substantially conform to the contour of the corresponding tab portions which project upwardly from the side panels 2—2' and to which they are to be adhesively secured. Thus, the paired secondary cross partition straps 18a—18a' and the secondary tab extensions 22b—22b' hinged thereto are shaped in conformity with the cross partition straps 8a—8a' and the adjacent tab portions 2b—2b'; the paired secondary cross partition straps 18b—18b' and the secondary tab extensions 22c—22c' hinged thereto are shaped in conformity with the corresponding cross partition straps 8b—8b' and the adjacent tab portions 2c—2c'; the paired secondary cross partition straps 18c—18c' and the secondary tab extensions 22d—22d' hinged thereto are shaped in conformity with the corresponding cross partition straps 8c—8c' and adjacent tab portions 2d—2d'; the paired secondary cross partition straps 18d—18d' and the secondary tab extensions 22e—22e' hinged thereto are shaped in conformity with the corresponding cross partition straps 8d—8d' and the adjacent tab portions 2e—2e'; and the paired secondary cross partition straps 18e—18e' and the secondary tab extensions 22f—22f' hinged thereto are shaped in conformity with the corresponding cross partition straps 8e—8e' and the adjacent tab portions 2f—2f'.

In the blank forms shown in Figs. 8 and 14, the inclined cuts 51—51' and spaced vertical scores 47—47' which define the secondary cross partition straps 18—18' also define the tab portions which extend downwardly from the inner center partition sections 11—11' and which are designed to be adhesively secured to the corresponding tab portions projecting downwardly from the adjacent outer center partition sections 7—7'. Thus, when carriers are assembled from the blanks shown in Figs. 8 and 14, the tabs 11f—11f' extending downwardly from the inner center partition 11—11' are shaped in conformity with and are designed to be adhesively secured to the tabs 7f—7f' extending downwardly from one end of the outer center partition sections 7—7'. Also, when the blanks shown in Figs. 8 and 14 are assembled into carrier form, the adjacent tabs 11e—11e' are in shape conformity with and are designed to be adhesively secured to the tabs 7e—7e'; tabs 11d—11d' are in shape conformity with and are designed to be adhesively secured to the tabs 7d—7d'; the tabs 11c—11c' are in shape conformity with and are designed to be adhesively secured to the corresponding tabs 7c—7c'; and the tabs 11b—11b' are in shape conformity with and are designed to be adhesively secured to the corresponding tabs 7b—7b'. However, it will be noted that while the end tab portions 11a—11a' of the blanks shown in Figs. 8 and 14 are designed to overlie and be adhesively secured to the tabs 7a—7a', they need not be in shape conformity therewith, but may be generally rectangular in form as shown in Fig. 8 or otherwise shaped as shown in Fig. 14.

When carriers are assembled from the blanks shown in Figs. 8 and 14, it will be noted that the vertical scores 47—47' which hinge the secondary cross partition straps 18—18' to the inner center partition sections 11—11' are so formed as to respectively align with the corresponding vertical scores 37—37' which hinge the main cross partition straps 8—8' to the downwardly projecting tabs of the outer center partition sections 7—7'. It will be further noted that the scores 48—48' which hinge the secondary tab extensions 22—22' to the respective secondary cross partition straps 18—18' are so formed as to align with the respective vertical scores 38—38' which hinge the lower ends of the main cross partition straps 8—8' to the respective upwardly projecting tab portions of the side panels 2—2'. As thus assembled, these carriers are provided with composite double-ply cross partition straps with double-ply hinge joints at both the upper and lower ends of the composite cross partition straps, and with the tab portions projecting upwardly from the side panels 2—2' also being strongly reinforced by the end tab extensions 22—22' adhesively secured thereto.

In the blank form shown in Fig. 8, the vertical scores 48—48' extend down to the lower free edge of the skeleton panels 9—9', and the secondary tab extensions 22—22' hinged by the scores 48—48' to their associated secondary cross partition straps 18—18' are substantially triangular in outline and generally conform to the shape of the tab portions 2b—2b'; 2c—2c'; 2d—2d'; 2e—2e' and 2f—2f' projecting upwardly from the side panels 2—2' and to which they are to be adhesively secured. In the blank form shown in Fig. 8, it will be noted that the end tab portions 11a—11a' present end extensions 23a—23a' whose lower edges are substantially in alignment with the adjacent lower edges of the adjacent end tab extensions 22—22' and are separated from the lower edge 49a—49a' of the adjacent secondary cross partition straps 18a—18a' by a notch cut-out. It will also be noted that the end tab extensions 22f—22f' project beyond the adjacent end edge of the inner center partition sections 11—11' and present free inclined edges 49f—49f'.

In the blank form shown in Fig. 14, the end tab extensions 22b—22b'; 22c—22c'; 22d—22d'; 22e—22e' and 22f—22f' are integrally joined to adjacent longitudinal extending connecting bands 24—24' designed to be secured to the inside face of the adjacent side panels 2—2'. It will also be noted that the end tab portions 11a—11a' have end extensions 25—25' projecting therefrom and lateral extensions 26—26' projecting longitudinally from the end extensions 25—25'. The end extensions 25—25' and associated lateral extensions 26—26' are separated from the adjacent lower edge of the connecting bands 24—24' by a longitudinal extending cut 54—54' joined to an adjacent inclined cut 53—53' which terminate at the vertical scores 47—47' which hinge the secondary cross partition straps 18a—18a' to the adjacent tab portions 11a—11a'. The end extensions 25—25' and their associated lateral extensions 26—26' together provide paired center divider sections which may extend substantially down to the erected bottom panel of the carrier formed from this blank, and thus serve to separate adjacent articles contained in the twin compartments of the carrier as shown in Figs. 18 and 19.

In assembling the carrier from the blank shown in Fig. 8, adhesive patches r—r' are first applied to the inside faces of the skeleton panels 11—11' over substantially the entire area thereof, including the inner center partition sections 11—11' and the associated secondary cross partition straps 18—18' and end tab extensions 22—22' as shown in Fig. 8, except that no adhesive is applied to the end portions of the tabs 11a—11a' or their end extensions 23a—23a' which will overlap the upper end of the end panel sections 4—4' when the carrier is assembled in collapsed form.

In the first folding operation, the skeleton panels 9—9' of blank shown in Fig. 8 are infolded along the longitudinal scores 42—42' so that the inner center partition sections 11—11' become adhesively secured to the adjacent outer center partition sections 7—7'. In this same folding operation, the secondary cross partition straps 18—18' become adhesively secured to the corresponding cross partition straps 8—8', with the transverse scores 47—47' and inclined cuts 51—51' in superimposed alignment with the corresponding transverse scores 37—37' and inclined cuts 41—41'. Additionally, the end tab extensions 22—22' become adhesively secured to the corresponding tab portions projecting upwardly from the side panels 2—2', with the transverse scores 48—48' and inclined cuts 49—49' in superimposed alignment with the corresponding transverse scores 38—38' and inclined cuts 39—39' as shown in Fig. 9. In this same folding operation, the end tab portions 11a—11a' of the inner center partition sections 11—11' become secured to the adjacent ends of the outer center partition sections 7—7' but are not secured to the adjacent end panel sections 4—4' which they will then overlie.

In the second gluing operation as shown in Fig. 9, vertical adhesive strips s—s' are applied to the ends of the inner center partition sections 11—11' of the infolded skeleton panels 9—9', care being taken to apply no adhesive to the adjacent secondary cross partition straps 18—18'. In the second folding operation, the end panel sections 3—3' are folded along the aligned transverse scores 33—33' so as to place the center partition flaps 5—5' associated therewith in adhesively secured relation to the adjacent glued end surfaces of the inner center partition sections 11—11' as shown in Fig. 10. In substantially the same folding operation, the center partition flaps 6—6' at the other end of the blank are infolded along the aligned transverse scores 36—36' so as to place the same in secured relation to the adjacent glued ends of the inner center partition sections 11—11'.

In the third and final gluing operation, an adhesive patch $t$ is applied to the exposed face of the inner center partition section 11' and the exposed tab portions thereof, and also to the center partition securing flaps 5' and 6' as shown in Fig. 10, care being taken to apply no adhesive to the exposed secondary cross partition straps 18' or their associated end tab extensions 22'. In the final folding operation, the partially assembled blank as shown in Fig. 10 is folded along the bottom collapsing score 31 so as to place the center partition securing flaps 5' and 6' in registered and secured relation to the corresponding center partition securing flaps 5 and 6, and to also secure the inner center partition section 11' and its associated tab portions in registered relation to the inner center partition section 11 and its corresponding tab portions, thereby completing the assembly of the carrier in collapsed form as shown in Fig. 11.

In assembling the carrier from the blank shown in Fig. 14, adhesive patches $u$—$u'$ are first applied to the skeleton panels to cover the inner center partition sections 11—11' and their associated secondary cross partition straps 18—18' and end tab extensions 22—22' and to additionally cover the connecting bands 24—24', care being taken to apply no adhesive to the end portions of the tabs 11a—11a' which will overlap the upper ends of the end panel sections 4—4' when the carrier is assembled in collapsed form. Nor is any adhesive applied at this stage to the end extensions 25—25' of the tab portions 11a—11a' nor to the associated lateral extensions 26—26' as shown in Fig. 14.

In the first folding operation, the skeleton panels 9—9' of the blank shown in Fig. 14 are infolded along the longitudinal scores 42—42' so that the inner center partition sections 11—11' become adhesively secured to the adjacent outer center partition sections 7—7'. In this same folding operation, the secondary cross partition straps 18—18' become adhesively secured to the corresponding cross partition straps 8—8', with the transverse scores 47—47' and inclined cuts 51—51' in superimposed alignment with the corresponding transverse scores 37—37' and inclined cuts 41—41'. Additionally, the end tab extensions 22—22' become adhesively secured to the corresponding tab portions projecting upwardly from the side panels 2—2', with the transverse scores 48—48' and inclined cuts 49—49' in superimposed alignment with the corresponding transverse scores 38—38' and inclined cuts 39—39' as shown in Fig. 15. In this same folding operation, the connecting bands 24—24' become adhesively secured to the adjacent inside faces of the side panels 2—2' and the end tab portions 11a—11a' of the inner center partition sections 11—11' become secured to the adjacent ends of the outer center partition sections 7—7', but are not secured to the adjacent end panel sections 4—4' which they overlie. In this folding operation, the end extensions 25—25' and their associated lateral extensions 26—26' will also overlie the adjacent end panel sections 4—4' and side panels 2—2' but will not become secured thereto.

In the second gluing operation as shown in Fig. 15, adhesive strips $v$—$v'$ are applied along the end edge of the skeleton panels 9—9' for the full height thereof and to thereby cover the end edge of the end extensions 25—25', the tab portions 11a—11a' and adjacent end edge of the inner center partition sections 11—11'. Additionally, spaced adhesive strips $w$—$w'$ are applied to the opposite ends of the inner center partition sections 11—11' and the adjacent ends of the lateral extensions 26—26', care being taken to apply no adhesive to the intervening secondary cross partition straps 18—18', or tab portions 22—22', or the connecting bands 24—24' as shown in Fig. 15. In the second folding operation, the end panel sections 3—3' are folded along the aligned transverse scores 33—33' so as to place the center partition flaps 5—5' associated therewith in adhesively secured relation to the adjacent glued ends of the inner center partition sections 11—11' and the lateral extensions 26—26' as shown in Fig. 16. In substantially the same folding operation, the center partition flaps 6—6' are infolded along the aligned transverse scores 36—36' so as to place the same in secured relation to the glue strips $v$—$v'$ applied to the adjacent ends of the skeleton panels 9—9' as shown in Fig. 16.

In the third and final gluing operation, an adhesive patch $x$ is applied to the exposed face of the inner center partition section 11' and the exposed tab portions thereof, and also to the exposed end extension 25' and lateral extension 26', and also to the center partition securing flaps 5' and 6' as shown in Fig. 16, care being taken to apply no adhesive to the exposed secondary cross partition straps 18' or their associated end tab extensions 22' or the associated connecting band 24'. In the final folding operation, the partially assembled blank shown in Fig. 16 is folded along the bottom collapsing score 31 so as to place the center partition securing flaps 5' and 6' in registered and secured relation to the corresponding center partition securing flaps 5 and 6, to also place the inner center partition sections 11' and associated tab portions in registered and secured relation to the inner center partition section 11 and its corresponding tab portions, and to also place the end extension 25' and its associated lateral extension 26' in registered and secured relation to the corresponding end extension 25 and the corresponding lateral extension 26. This folding operation completes the assembly of the carrier in collapsed form as shown in Fig. 17.

The collapsed carriers shown in Figs. 4, 11 and 17, formed and assembled as above described, may be readily expanded by exerting pressure against the ends thereof. These carriers may be maintained in erected form as shown in Figs. 6, 12 and 18 by connecting the paired hooked portions 31" extending from the lower ends of the center partition securing flaps 5—5' to the adjacent notch 31' formed in the adjacent end of the bottom panel.

Carriers constructed in accordance with this invention are featured by handle parts of four-ply construction, formed by the inner center partition sections 11—11' sandwiched between and adhesively secured to the outer center partition sections 7—7'. These four-ply handle parts, secured to the end extensions 5" and 6" of the center partition securing flaps 5—5' and 6—6' also provide a strong and rugged center partition structure which gives backbone strength to these carriers.

As a further feature, the main cell-defining cross partition straps 8—8' are greatly strengthened by reinforcing elements integrally hinged to tab portions extending downwardly from the inner center partition sections 11—11'. In the carrier shown in Fig. 6, formed from the blank shown in Fig. 1, these reinforcing elements may comprise generally triangular shaped segments 15—15' which overlap and are adhesively secured to the corresponding main cross partition straps 8—8' to thereby provide a double hinged joint as formed by the aligned transverse scores 37—47 and 37'—47' which greatly strengthens the cross partition straps in the areas where they receive the greatest strain in use.

By a slight increase in the over-all width of the blank as shown in Fig. 8, carriers may be made as shown in Fig. 12 provided with composite double-ply cell-defining cross partition straps with double thickness hinging joints at both ends thereof. This desirable construction is obtained by increasing the width of the skeleton panels 9—9' so as to provide secondary cross partition straps 18—18' of substantially the same width and length as the corresponding main cross partition straps 8—8'. The inner ends of the composite double-ply cross partition straps also have double-ply hinging joints as formed by the aligned scores 37—47 and 37'—47'. The outer ends of the composite double-ply cross partition straps as shown in Fig. 12 are also provided with double-ply hinging joints as formed by the aligned transverse scores 38—48 and 38'—48'. Additionally, the tab portions projecting upwardly from the side panels 2—2' are also strengthened and reinforced by the secondary tab extensions 22—22' associated with the secondary cross partition straps 18—18'. A strong and rugged strap partitioned carrier, which is durable and lasting in use and relatively inexpensive to manufacture, is thus provided.

By a further slight increase in the over-all width of the blank as shown in Fig. 14, a strap partitioned carrier having a double-ply center divided may also be formed in accordance with this invention to provide cushioned separation for the adjacent articles in the twin compartments of the carrier. In the carrier form shown in Fig. 18, composite double-ply cross partition straps are formed by the secondary cross partition straps 18 as adhesively secured to the main cross partition straps 8 and by the secondary cross partition straps 18' as adhesively secured to the main cross partition straps 8'. The upper ends of these composite double-ply cross partition straps also have double-ply hinging joints as formed by the aligned transverse scores 37—47 and 37'—47'. The lower ends of these composite double-ply cross partition straps are also provided with double-ply hinging joints as defined by the aligned transverse scores 38—48 and 38'—48'. The side panels 2—2' of this carrier and their associated upwardly projecting tab portions are also stiffened and reinforced by the connecting bands 24—24' and the associated tab extensions 22—22' as clearly shown in Figs. 18 and 19. Additionally, the paired end extensions 25—25' and their associated lateral extensions 26—26' form paired center divider sections extending the full length of the carrier directly below the composite double-ply cross partition straps to thereby provide cushioned protection for the adjacent articles in the twin compartments of the carrier. The free ends of the end extensions 25—25' and the free ends of the lateral extensions 26—26' are also adhesively secured to the adjacent inturned center partition flaps 6—6' and 5—5' to further strengthen and reinforce the carrier.

It will be appreciated that carriers may be made in accordance with this invention having any number of paired cross partition straps to provide any number of article receiving cells. By shortening the length of these blanks, and eliminating a corresponding number of the main cross partition straps 8—8' and their associated reinforcing segments 15—15' or secondary cross partition straps 18—18', a corresponding reduction in the number of cells would be attained. These carriers, however, have the strength and durability to provide at least twelve article receiving cells therein.

While certain novel features of this invention have been disclosed herein and are pointed out in the claims, it will be understood that various omissions, substitutions and changes may be made by those skilled in the art without departing from the spirit of this invention.

What is claimed is:

1. A multi-cell twin compartmented article carrier formed from a single blank of sheet material including, a bottom panel, a pair of side panels foldably connected to the opposite side edges of the bottom panel, a pair of end panel sections at each end of the carrier foldably connected to the adjacent end edges of the side panels, a pair of inner center partition sections integrally hinged along the upper horizontal edge thereof to a pair of outer center partition sections, said inner and outer center partition sections being secured together in overlapped relationship and providing a plural-ply center partition and handle forming structure for the carrier which is foldably connected at the ends thereof to both pairs of end panel sections and extends along the longitudinal mid-section of the carrier and projects above the side panels and has a finger insertion opening therein, a series of main cross partition straps arranged in spaced cell-forming relation and integrally hinged along vertical scores to the lower portion of each of the two outer center partition sections and integrally hinged at the other ends thereof to the adjacent side panels, a series of secondary cross partition elements complementary to said main cross partition straps and integrally hinged to the corresponding lower portion of each of said inner center partition sections along vertical scores which are in substantial folding registry with adjacent vertical scores which hinge the main cross partition straps to the adjacent outer center partition section, said secondary cross partition elements being secured to the adjacent series of main cross partition straps, at least one of said inner center partition sections having an end extension and a lateral extension integral therewith and positioned along the longitudinal mid-section of the carrier and providing a center divider for the twin compartments thereof.

2. A multi-cell twin compartmented article carrier formed from a single blank of sheet material including, a bottom panel, a pair of side panels foldably connected to the opposite side edges of the bottom panel, a pair of end panel sections at each end of the carrier foldably connected to the adjacent end edges of the side panels, a pair of inner center partition sections integrally hinged along the upper horizontal edge thereof to a pair of outer center partition sections, said inner and outer center partition sections being secured together in overlapped relationship and providing a plural-ply center partition and handle forming structure for the carrier which is foldably connected at the ends thereof to both pairs of end panel sections and extends along the longitudinal mid-section of the carrier and projects above the side panels and has a finger insertion opening therein, a series of main cross partition straps arranged in spaced cell-forming relation and integrally hinged along vertical scores to the lower portion of each of the two outer center partition sections and integrally hinged at the other ends thereof to the adjacent side panels, a series of secondary cross partition straps complementary to said main cross partition straps and integrally hinged to the corresponding lower portion of each of said inner center partition sections along vertical scores which are in substantial folding registry with adjacent vertical scores which hinge the main cross partition straps to the adjacent outer center partition section, said secondary cross partition straps being secured to the adjacent series of main cross partition straps for the full length thereof, and end extensions integrally hinged to each of said secondary cross partition straps and secured to the adjacent side panel, each of said inner center partition sections having an end extension and a lateral extension integral therewith and positioned along the longitudinal mid-section of the carrier and providing a double-ply center divider for the twin compartments thereof.

3. A multi-cell twin compartmented article carrier forming blank having a bottom panel, a pair of side panels foldably connected to the opposite side edges of said bottom panel, an end panel section foldably connected to each end edge of both side panels, a center partition securing flap foldably connected to each of said end panel sections and having an end extension projecting beyond the top edge of the adjacent end panel section, a pair of outer center partition sections each integrally hinged at one end thereof to the adjacent end extension of an adjacent center partition flap, a series of main cross partition straps integrally hinged at one end thereof by vertical scores to tab portions projecting downwardly from each of said outer center partition sections and integrally hinged along spaced vertical scores to tab portions projecting upwardly from the adjacent side panel, and a pair of skeleton panels each of which includes, an inner center partition section foldably connected to the top edge of the adjacent outer center partition section and presenting tab portions projecting therefrom, and a series of strap reinforcing elements integrally hinged at one end thereof by spaced transverse scores to the tab portions projecting from the inner center partition section, one of the tab portions at one end of said inner center partition section having an end extension and an associated lateral extension projecting beyond the adjacent strap reinforcing elements.

4. A multi-cell twin compartmented article carrier forming blank having a bottom panel, a pair of side panels foldably connected to the opposite side edges of said bottom panel, an end panel section foldably connected to each end edge of both side panels, a center partition securing flap foldably connected to each of said end panel sections and having an end extension projecting beyond the top edge of the adjacent end panel section, a pair of outer center partition sections each integrally hinged at one end thereof to the adjacent end extension of an adjacent center partition flap, a series of main cross partition straps integrally hinged at one end thereof by vertical scores to tab portions projecting downwardly from each of said outer center partition sections and integrally hinged along spaced vertical scores to tab portions projecting upwardly from the adjacent side panel, and a pair of skeleton panels each of which includes, an inner center partition section foldably connected to the top edge of the adjacent outer center partition section and presenting tab portions projecting therefrom, and a series of secondary cross partition straps corresponding in size and length to said main cross partition straps and integrally hinged at one end thereof by spaced transverse scores to the tab portions projecting from said inner center partition section, each of said secondary cross partition straps having an end extension integrally hinged at the opposite end thereof by a transverse score, one of the tab portions at one end of said inner center partition section having an end extension and an associated lateral extension projecting beyond the adjacent secondary cross partition straps and their associated end extensions.

5. A multi-cell twin compartmented article carrier forming blank having a bottom panel, a pair of side panels foldably connected to the opposite side edges of said bottom panel, an end panel section foldably connected to each end edge of both side panels, a center partition securing flap foldably connected to each of said end panel sections and having an end extension projecting beyond the top edge of the adjacent end panel section, a pair of outer center partition sections each integrally hinged at one end thereof to the adjacent end extension of an adjacent center partition flap, a series of main cross partition straps integrally hinged at one end thereof by vertical scores to tab portions projecting downwardly from each of said outer center partition sections and integrally hinged along spaced vertical scores to tab portions projecting upwardly from the adjacent side panel, and a pair of skeleton panels each of which includes, an inner center partition section foldably connected to the top edge of the adjacent outer center partition section and presenting tab portions projecting therefrom, a series of secondary cross partition straps corresponding in size and length to said main cross partition straps and integrally hinged at one end thereof by spaced transverse scores to the tab portions projecting from said inner center partition section, and a side wall liner band connected to the other ends of said secondary cross partition straps along spaced vertical extending scores, one of the tab portions at one end of said inner center partition section having an end extension and an associated lateral extension projecting beyond the adjacent secondary cross partition straps and associated side wall liner band.

6. A multi-cell twin compartmented article carrier formed from a single blank of sheet material including, a bottom panel, a pair of side panels integrally hinged to the opposite side edges of the bottom panel, a pair of end panel sections at each end of the carrier foldably connected to the adjacent end edges of the side panels, a pair of inner handle forming sections integrally hinged along the upper horizontal edge thereof to a pair of outer handle forming sections, said inner and outer handle forming sections being secured together in overlapped relationship and providing a plural-ply handle forming structure for the carrier which is foldably connected to both pairs of end panel sections and extends along the longitudinal mid-section of the carrier and projects above the side panels and has a finger insertion opening therein, spaced outer tab portions extending downwardly from the lower edge of each of said outer handle forming sections, and a series of spaced and inclined cross partition straps integrally hinged along vertical scores to said outer and downwardly projecting tab portions and integrally hinged at the other ends thereof by vertical scores to spaced tab portions integral with and projecting upwardly from the adjacent side panel, each of said inner handle forming sections presenting a series of spaced inner tab portions complementary to said outer tab portions and extending downwardly from the lower edge thereof and secured in underlying and registered relation to the adjacent outer and downwardly projecting tab portions of the adjacent outer handle forming sections whereby said outer tab portions are strengthened and reinforced against rupture, at least one of said inner handle forming sections having an integral end extension projecting downwardly below the inner tab portions thereof and a foot extension integral with and projecting laterally from said end extension and extending longitudinally of the carrier, said end extension and foot extension providing a center divider for the twin compartments of the carrier.

7. A multi-cell twin compartmented article carrier formed from a single blank of sheet material including, a bottom panel, a pair of side panels integrally hinged to the opposite side edges of the bottom panel, a pair of end panel sections at each end of the carrier foldably connected to the adjacent end edges of the side panels, a pair of inner handle forming sections integrally hinged along the upper horizontal edge thereof to a pair of outer handle forming sections, said inner and outer handle forming sections being secured together in overlapped relationship and providing a plural-ply handle forming structure for the carrier which is foldably connected to both pairs of end panel sections and extends along the longitudinal mid-section of the carrier and projects above the side panels and has a finger insertion opening therein, spaced outer tab portions extending downwardly from the lower edge of each of said outer handle forming sections, and a series of spaced and inclined cross partition straps integrally hinged along vertical scores to said outer and downwardly projecting tab portions and integrally hinged at the other ends thereof by vertical scores to spaced tab portions integral with and projecting upwardly from the adjacent side panel, each of said inner handle forming sections presenting a series of spaced inner tab portions complementary to said outer tab portions and extending downwardly from the lower edge thereof and secured in underlying and registered relation to the adjacent outer and downwardly projecting tab portions of the adjacent outer handle forming sections whereby said outer tab portions are strengthened and reinforced against rupture, each of said inner handle forming sections having an integral end extension projecting downwardly below the inner tab portions thereof and a foot extension integral with and projecting laterally from said end extension and extending longitudinally of the carrier, said paired end extensions providing a double-ply center divider for the twin compartments of the carrier.

8. A multi-cell twin compartmented article carrier forming blank having a bottom panel, a pair of side panels integrally hinged to the opposite side edges of said bottom panel, an end panel section integrally hinged to each end edge of both side panels, a center partition flap integrally hinged to each of said end panel sections and having an end extension projecting beyond the top edge of the adjacent end panel section, a pair of outer handle forming sections each integrally hinged at one end thereof to the adjacent end extension of the adjacent center partition flap, a series of main cross partition straps integrally hinged by spaced vertically extending scores to outer tab portions projecting downwardly from each of said outer handle forming sections and integrally hinged along spaced vertical scores to tab portions projecting upwardly from the adjacent side panel, a pair of inner handle forming sections each foldably connected to the top horizontal edge of the adjacent outer handle forming section, each of said inner handle forming sections presenting a series of spaced inner tab portions complementary to said outer tab portions and extending laterally along the adjacent free horizontal edge thereof and designed to be secured in registering overlying relation to the adjacent outer tab portions projecting from the adjacent outer handle forming section whereby said outer tab portions are strengthened and reinforced against rupture when the blank is assembled into carrier form, at least one of said inner handle forming sections having an integral end extension projecting beyond the inner tab portions thereof and a foot extension integral with and projecting laterally from said end extension and separated from the adjacent inner tab portions, said end extension and foot extension being designed to provide a center divider for the twin compartments of the carrier when the blank is assembled into carrier form.

9. A multi-cell twin compartmented article carrier forming blank having a bottom panel, a pair of side panels integrally hinged to the opposite side edges of said bottom panel, an end panel section integrally hinged to each end edge of both side panels, a center partition flap integrally hinged to each of said end panel sections and having an end extension projecting beyond the top edge of the adjacent end panel section, a pair of outer handle forming sections each integrally hinged at one end thereof to the adjacent end extension of the adjacent center partition flap, a series of main cross partition straps integrally hinged by spaced vertically extending scores to outer tab portions projecting downwardly from each of said outer handle forming sections and integrally hinged along spaced vertical scores to tab portions projecting upwardly from the adjacent side panel, a pair of inner handle forming sections each foldably connected to the top horizontal edge of the adjacent outer handle forming section, each of said inner handle forming sections presenting a series of spaced inner tab portions complementary to said outer tab portions and extending laterally along the adjacent free horizontal edge thereof and designed to be secured in registering overlying relation to the adjacent outer tab portions projecting from the adjacent outer handle forming section whereby said outer tab portions are strengthened and reinforced against rupture when the blank is assembled into carrier form, each of said inner handle forming sections having an integral end extension projecting beyond the inner tab portions thereof and a foot extension integral with and projecting laterally from said end extension and separated from the adjacent inner tab portions, said end extensions and foot extensions providing a center divider for the twin compartments of the carrier when the blank is assembled into carrier form.

References Cited in the file of this patent

UNITED STATES PATENTS

| | | |
|---|---|---|
| 2,351,528 | Lupton | June 13, 1944 |
| 2,458,281 | Lupton | Jan. 4, 1949 |
| 2,578,174 | Crane | Dec. 11, 1951 |
| 2,598,920 | Keith | June 3, 1952 |
| 2,615,612 | Vines | Oct. 28, 1952 |
| 2,616,611 | Arneson | Nov. 4, 1952 |
| 2,660,361 | Tyrseck | Nov. 24, 1953 |
| 2,687,232 | Arneson | Aug. 24, 1954 |